United States Patent
Dodgson et al.

(10) Patent No.: US 7,912,144 B2
(45) Date of Patent: Mar. 22, 2011

(54) INTEGRATED MODULATORS AND DEMODULATORS

(75) Inventors: Terence Edwin Dodgson, Staines (GB); Charles Tibenderana, Southampton (GB)

(73) Assignee: Samsung Electronics Co., Ltd (KR)

( * ) Notice: Subject to any disclaimer, the term of this patent is extended or adjusted under 35 U.S.C. 154(b) by 2394 days.

(21) Appl. No.: 10/648,560

(22) Filed: Aug. 25, 2003

(65) Prior Publication Data

US 2004/0091031 A1    May 13, 2004

(30) Foreign Application Priority Data

Aug. 23, 2002   (GB) .................................. 0219740.8

(51) Int. Cl.
*H04L 27/00* (2006.01)
(52) U.S. Cl. ........ 375/295; 375/220; 375/260; 375/324; 455/102; 455/115.1; 329/316; 329/348; 332/108; 332/119; 332/151
(58) Field of Classification Search .................. 375/260, 375/261, 268, 269, 271–274, 279, 298, 295, 375/300, 302, 303, 305, 308, 320, 322, 324, 375/329, 334, 340, 220, 222; 455/102, 110, 455/115.1, 307; 329/316, 317, 348; 332/108, 332/119, 120, 151
See application file for complete search history.

(56) References Cited

U.S. PATENT DOCUMENTS

| 5,602,868 | A  | * | 2/1997  | Wilson ........................ | 375/219 |
| 5,648,923 | A  | * | 7/1997  | Lane et al. .................... | 708/319 |
| 5,673,293 | A  | * | 9/1997  | Scarpa et al. ................. | 375/321 |
| 5,764,699 | A  | * | 6/1998  | Needham et al. ............. | 375/261 |
| 5,982,819 | A  | * | 11/1999 | Womack et al. .............. | 375/316 |
| 6,553,079 | B1 | * | 4/2003  | Piirainen ...................... | 375/269 |
| 6,882,618 | B1 | * | 4/2005  | Sakoda et al. ................ | 370/208 |
| 7,298,798 | B1 | * | 11/2007 | Chao et al. ................... | 375/341 |
| 2002/0067755 | A1 |  | 6/2002 | Perkins | |

FOREIGN PATENT DOCUMENTS

| CN | 1132449       | 10/1996 |
| EP | 0 713 337     | 5/1996  |
| EP | 0 847 169     | 6/1998  |
| EP | 1 071 235     | 1/2001  |
| WO | WO 99/39484   | 8/1999  |

OTHER PUBLICATIONS

IEEE 802.11 b-1999 standard.
M. Webster, C. Anderson, J. Boer and R. Van Nee: "Introducing the Harris-Lucent Compromise Proposal for TBB", DOC: IEEE P02.11-98/246 & 232, 1998.
C. Andren, M. Webster and K. Halford: "CCK, the New IEEE 802.11 Standard for 2.4 GHz Wireless LANs".

(Continued)

*Primary Examiner* — Dac V Ha
(74) *Attorney, Agent, or Firm* — The Farrell Law Firm, P.C.

(57) ABSTRACT

A modulating means for modulating and/or demodulating data for transmission from a first device to a second device, wherein the modulating means is capable of modulating and/or demodulating data according to at least a first and a second modulation technique.

15 Claims, 14 Drawing Sheets

OTHER PUBLICATIONS

C. Andren and M. Webster: "A 2.4 Ghz 11 Mbps Baseband Processor for 802.11 Applications", 2002.
Steel and Hanzo, "Mobile Radio Communications", Wiley 1992.
Watson, "FSK Signals and Demodulation", 1980.
Bob Pearson, Complementary Code Keying Made Simple, May 2000.
Kamilo Feher et al., Modulation/Microwave Integrated Digital Wireless Developments, IEEE Transactions on Microwave Theory and Techniques, 1995.
Michael Heeg: "Networking without Cord, New Chip Set Accelerates Local radio Networks to 11 Mbit/s", May 18, 1999.

* cited by examiner

INTEGRATED MODULATORS AND DEMODULATORS

PRIORITY

This application claims priority under 35 U.S.C. §119 to an application entitled "Integrated Modulators and Demodulators" filed in the United Kingdom on Aug. 23, 2002 and assigned Serial No. 0219740.8, the contents of which are incorporated herein by reference.

BACKGROUND OF THE INVENTION

1. Field of the Invention

This patent application relates to the field of data transfer. More particularly, but not exclusively, it relates to a modem for data transfer, which is capable of modulating or demodulating data using multiple modulation techniques.

2. Description of the Related Art

In order to transmit information or data from one point to another or from one device to a second device, either via a communication line or a wireless link, data is transformed into a suitable form for being transmitted, typically by putting it onto a carrier. This is called modulation. After the data has been received by the second device, the modulated data is "demodulated", i.e. removed from the carrier and brought back into a suitable form for future use by the second device.

More and more devices are designed to communicate with each other, for example via a local area network (LAN). For wireless LANs, different modulation standards have been introduced for ensuring compatibility such as the IEEE 802.11 standard. A similar concept for data transmission, but more commonly used for Personal Area Networking (PAN), can be seen in the Bluetooth™ standard.

Devices capable of communicating with other devices via a particular modulation technique each include a modulator and/or a demodulator, which is particularly designed for modulating/demodulating data according to the particular modulation technique. For example, referring now to FIG. 2, a modem 30 is illustrated, including a modulator 32 and a demodulator 34. The modulators and demodulators for different modulation techniques can differ considerably from each other.

If one particular device is designed to communicate using two different standards, for example the IEEE 802.11 and the Bluetooth standard, the approach adopted in the prior art is to use a combined modem including two separate modems, wherein each of these separate modems works according to one modulation technique. Such a modem is illustrated in FIG. 3.

Referring to FIG. 3, the modem 40 includes two separate modems 41 and 47. Modem 41 comprises modulator 42 and demodulator 44, whereas the modem 47 comprises modulator 43 and demodulator 45. The first modulator 42 and the first demodulator 44 are specific to the IEEE 802.11b technique and the second modulator 43 and the second demodulator 45 are specific to the Bluetooth standard. In addition to the two modems, an additional switching and interworking element 46 is required, which ensures that data is modulated according to the desired standard for a particular application and that incoming modulated data is correctly demodulated. The interworking element 46 also ensures that each modem pair is correctly updated with control information to ensure that any switching between modems has the correct timing alignment and that correct control procedures are carried out.

Accordingly, the present invention has been designed to improve the system described above.

SUMMARY OF THE INVENTION

According to one aspect of the present invention there is provided a modulating device comprising means for modulating and/or demodulating data for transmission, wherein the modulating means is capable of modulating and/or demodulating data according to at least a first and a second modulation technique using common digital modulation components.

Preferably, the modulating means comprises a plurality of building blocks, wherein at least one of said building blocks are adapted to be used to modulate data according to said at least first and second modulation technique.

The first technique may involve quadrature modulation and the second may involve frequency modulation.

In this way, a more efficient use of modem modules is ensured by avoiding duplication of modulation and/or demodulation modules. The integrated modem comprises a single modulator and single demodulator. This integrated architecture performs the integration at a deeper level than the conventional way of simply including two separate modems and switching/interworking between the two as appropriate. Lighter and smaller designs of devices become possible, which provide compatibility of more than one communications standard. If less space is occupied by the modem, other functional elements, like for example additional memory, can be inserted.

Preferably, a modulating means wherein said modulating means is adapted to automatically switch between said first and second mode.

In this way, no additional switching/interworking element is required. Less hardware and code is needed to provide multiple modem functionality, and the complexity of the system can be reduced compared to the prior art solution.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

Figure 1:
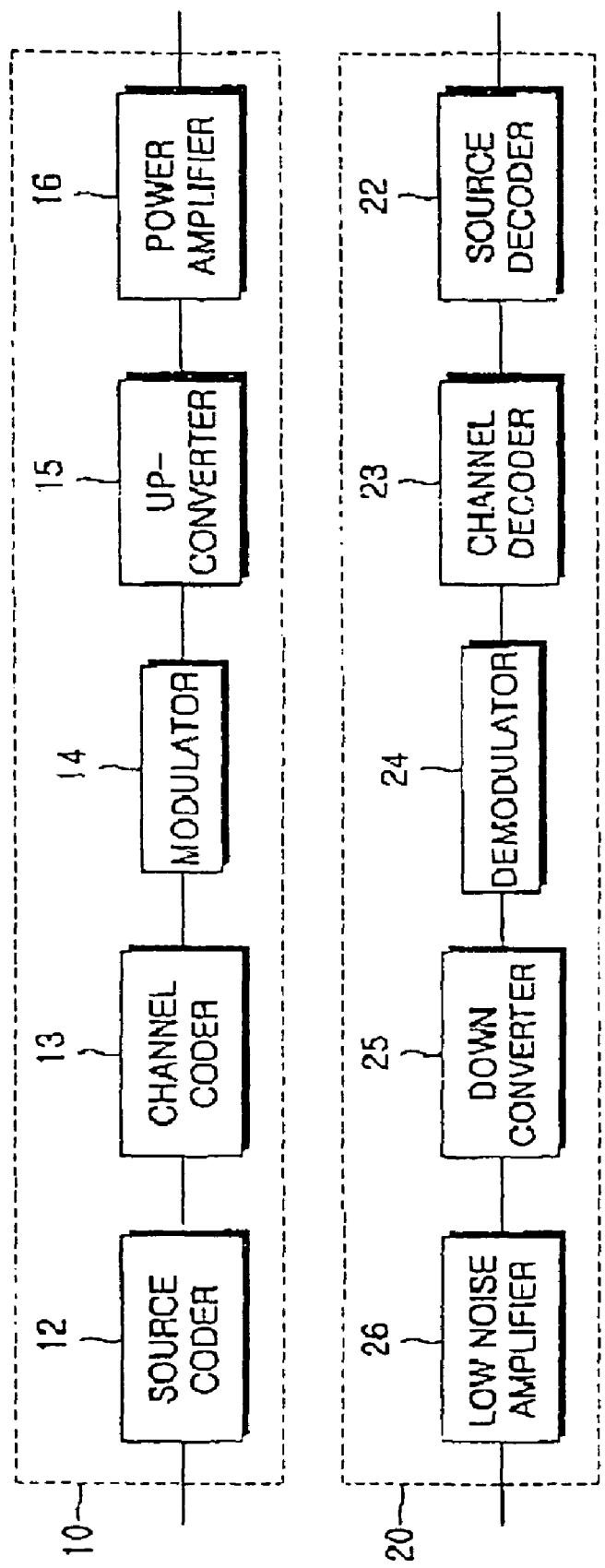
FIG. 1 is a schematic outline of elements used for communicating of digital data in a communications system.

Referring now to FIG. 1, the elements typically used for communicating digital data between two devices are illustrated. The transmitter 10 comprises a source coder 12, a channel coder 13, a modulator 14, an up-converter 15, and a power amplifier 16. The receiver 20 comprises a low noise amplifier 26, a down-converter 25, a demodulator 24, a channel decoder 23, and a source decoder 22.

In operation, the data to be transmitted is provided, in a suitable digital form, to the source coder 12 (e.g. a voice codec such as an LPC coder, or an image codec such as a JPEG or MPEG coder), which removes any information redundancy. The output of the source coder 12 is ideally an uncorrelated data stream, which is represented by fewer bits than the original data stream. In channel coder 13 (e.g. a Viterbi or turbo coder), the data is prepared such that channel errors can be detected and/or corrected at the receiver. Commonly, this is achieved by the channel coder 13 adding redundancy bits, which enables the receiver to detect and/or correct possible errors.

Modulator 14 transforms the data into a form suitable for transmission. Digital modulation can usually be divided into two parts: (1) digital processing of the incoming bit stream; and (2) converting the resulting processed data into an analog form, for transmission, for example, over the air.

In up-converter 15 the data is translated to the frequency where bandwidth has been allocated for the transmission, and the output original strength is subsequently enhanced in power amplifier 16 such that the power is sufficient to transmit the data to the receiving device.

At the receiver 20, the data received is first amplified in the low noise amplifier 26. The data has been attenuated through the transmission from one device to another and are therefore enhanced in low noise amplifier 26 such that it is at a level suitable for further handling by the following elements of the receiver 20. Preferably, the amplifier 26 does not add any further significant noise to the received data.

The downconverter 25 then moves the data signals from their allocated transmission bandwidth to a predetermined baseband. In demodulator 24, the process of modulation carried out in the transmitter 10 is converted back into a digital form.

In the channel decoder 23, errors that occurred during transmission of the data via the transmission channel are detected and corrected. The output from the channel decoder 23 is then brought into a form required by the point of reception in a source decoder 22.

Figure 2:
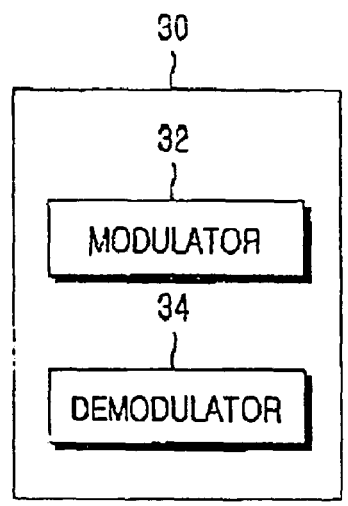
FIG. 2 is a block diagram of a modem in which the present invention can be implemented.
Figure 3:
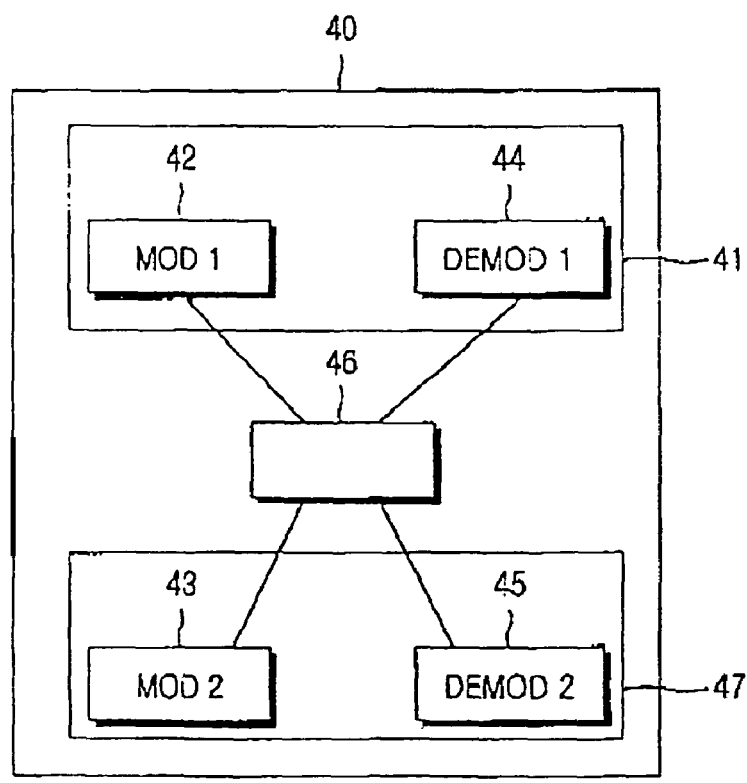
FIG. 3 is a block diagram of a modem according to the prior art.

FIG. 2 is a block diagram of a modem in which the present invention can be implemented. Referring to FIG. 2, a device capable of communicating using a particular modulation technique comprises a modem 30, i.e. a modulator 32 and a demodulator 34, specifically designed for modulation and demodulation according to that particular modulation technique. There are many different forms of digital modulation/demodulation. Complementary Code Keying (CCK) with Differential Quadrature Phase Shift Keying (DQPSK), referred to as CCK+DQPSK in the following, is for example used in the IEEE802.11b standard. Gaussian Frequency Shift Keying (GFSK) is for example used in the Bluetooth™ standard. Herein below, the principles of CCK+DQPSK keying will be described.

Complementary Code Keying with DQPSK Description

Complementary Code Keying (CCK) is designed to increase underlying user data rates while maintaining user bandwidth. More details on CCK may be found in IEEE 802.11 b-1999 standard, or in M. Webster, C. Anderson, J Boer and R. Van Nee: "Introducing the Harris-Lucent Compromise Proposal for TGb", doc: IEEE P02. 11-98/246 & 232, 1998, C. Andren, M. Webster and K. Halford: "CCK, the New IEEE 802.11 Standard for 2.4 GHz Wireless LANs" or C. Andren and M. Webster: "A 2.4 GHz 11 Mbps Baseband Processor for 802.11 Applications", 2002.

Code words used in CCK modulation are called complementary codes. Complementary codes have low crosscorrelation and good autocorrelation properties.

CCK as described herein encodes 8 bits of information in a single code word, and the ratio of information bits encoded to number of output chips is 1:1. CCK is a form of M-ary orthogonal keying modulation in which one of a set of M unique code words is chosen for transmission, based on the information bits at the input of the modulator. A CCK code word is 8 complex chips in length, and the choice of code word to be transmitted is dependent on:

(a) the 8 information bits at the input of the modulator;
(b) the previously encoded code word; and
(c) whether the symbol (8-chips) occupies an even or odd (data bit) position in the output data stream.

The encoding of the 8-bit word $d_0 d_1 d_2 d_3 d_4 d_5 d_6 d_7$ is described in the following.

The first dibit $d_0 d_1$ is encoded using DQPSK. Accordingly, there is a phase change $\Delta\theta$, i.e., a change in phase between the actual phase value $\theta$ and the phase $\theta'$ of the previous code word. Depending on the position in the output data stream, i.e., whether the data occupies an even or odd position, different values for the phase change $\Delta\theta$, are associated to the dibit $d_0 d_1$. The DQPSK encoding table used for encoding the first dibit is shown below in Table 1.

TABLE 1

DQPSK Encoding Table

| Dibit pattern $(d_0 d_1)$ | Even symbols phase change in $\theta_1$ (i.e. $\Delta\theta_1$) | Odd symbols phase change in $\theta_1$ (i.e. $\Delta\theta_1$) |
|---|---|---|
| 00 | 0 | $\pi$ |
| 01 | $\pi/2$ | $-\pi/2$ |
| 11 | $\pi$ | 0 |
| 10 | $-\pi/2$ | $\pi/2$ |

The remaining dibits are encoded using QPSK. Phases $\theta_2$, $\theta_3$, and $\theta_4$ are associated with dibits $d_2 d_3$, $d_4 d_5$, and $d_6 d_7$, respectively, according to the QPSK encoding table shown in Table 2 below.

TABLE 2

QPSK Encoding Table

| Dibit pattern ($d_i d_{i+1}$) | Phase ($\theta_x$) |
|---|---|
| 00 | 0 |
| 01 | $\pi/2$ |
| 10 | $\pi$ |
| 11 | $-\pi/2$ |

The CCK code word $C_0 C_1 C_2 C_3 C_4 C_5 C_6 C_7$ is then built according to table 3 using the complex symbols $\exp(j(\theta_1))$, $\exp(j(\theta_2))$, $\exp(j(\theta_3))$, and $\exp(j(\theta_4))$, using the phases $\theta_1$ to $\theta_4$ as obtained from the QPSK dibit encoding described above.

Figure 4:
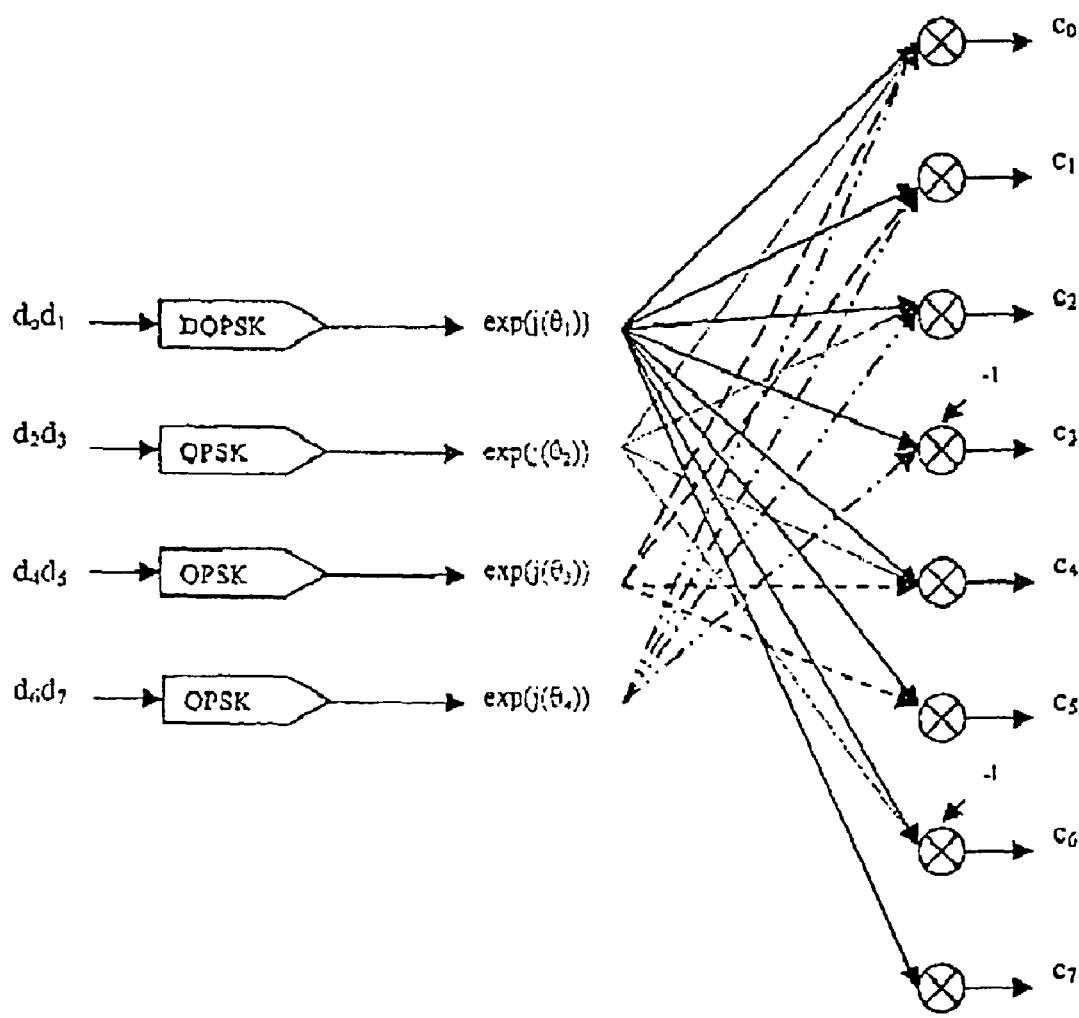
FIG. 4 illustrates CCK code word generation.

The CCK code word determination is illustrated in FIG. 4. Referring to FIG. 4, the first dibit $d_0 d_1$, is DQPSK modulated, resulting in a phase $\theta$. The second to fourth dibits $d_2 d_3$, $d_4 d_5$, and $d_6 d_7$ are QPSK encoded. The CCK code word building using QPSK encoding in phases $\theta_2$, $\theta_3$, and $\theta_4$ can be interpreted as modulating every odd chip, every odd pair of chips, and every odd quadruple of chips, respectively, as can be seen in Table 3 and FIG. 4.

TABLE 3

CCK Code word

| Code word Element | Value |
|---|---|
| $C_0$ | $\exp(j(\theta_1 + \theta_2 + \theta_3 + \theta_4))$ |
| $C_1$ | $\exp(j(\theta_1 + \theta_3 + \theta_4))$ |
| $C_2$ | $\exp(j(\theta_1 + \theta_2 + \theta_4))$ |
| $C_3$ | $-\exp(j(\theta_1 + \theta_4))$, |
| $C_4$ | $\exp(j(\theta_1 + \theta_2 + \theta_3))$ |
| $C_5$ | $\exp(j(\theta_1 + \theta_3))$ |
| $C_6$ | $-\exp(j(\theta_1 + \theta_2))$ |
| $C_7$ | $\exp(j(\theta_1))$ |

TABLE 4

CCK Code word look-up table

| INPUT DATA WORD $d_2 d_3 d_4 d_5 d_6 d_7$ | OUTPUT CODE WORD $c_0 c_1 c_2 c_3 c_4 c_5 c_6 c_7$ |
|---|---|
| 0 0 0 0 0 0 | +1 +1 +1 −1 +1 +1 −1 +1 |
| 1 0 0 0 0 0 | −1 +1 −1 −1 −1 +1 +1 +1 |
| . | . |
| . | . |
| 1 1 1 1 1 1 | +j −1 −1 +j −1 −j +j +1 |

In contrast, $\theta_1$ modulates every chip, i.e. every code word element $C_0$ to $C_7$ includes the factor $\exp(j(\theta_1))$. Thus, the effect of including the information of the first dibit is a phase rotation of the complex chip word, which is built using QPSK encoding.

CCK+DQPSK Modulator

Figure 5:
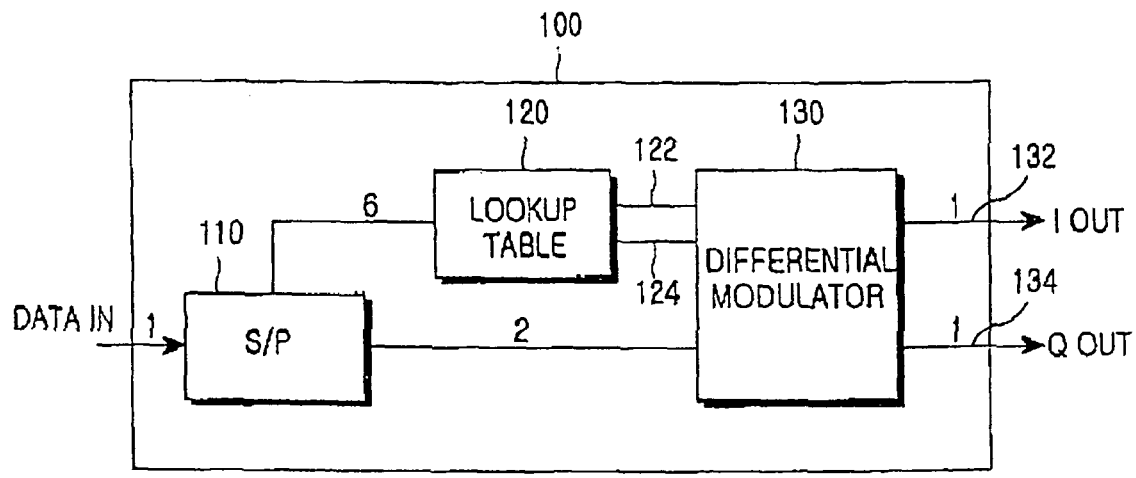
FIG. 5 is block diagram illustrating a CCK+DQPSK modulator according to the prior art.

FIG. 5 is block diagram illustrating a conventional CCK+ DQPSK modulator. Referring to FIG. 5, the CCK+DQPSK modulator 100 comprises a serial-to-parallel (S/P) converter 110, a look-up table 120, and a differential modulator 130. In a first step, incoming data is serial-to-parallel converted into eight parallel data lines by S/P converter 110. For example, the rate of the input data is 11 MHz, whereas the output is clocked at 1.375 MHz.

Figure 6:
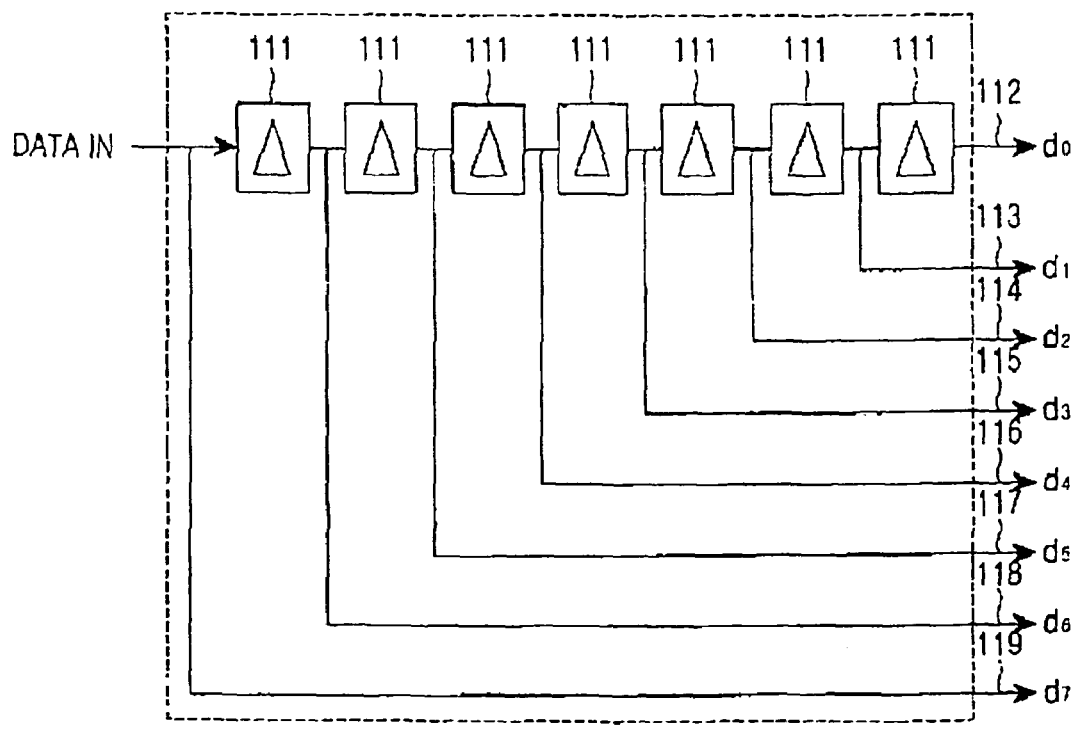
FIG. 6 is a block diagram illustrating a serial-to-parallel converter for the modulator of FIG. 5.

FIG. 6 illustrates a Serial-to-parallel converter 110 including a shift register comprising 7 delay lines 111. The output of the converter 110 are bits $d_0$ to $d_7$ on lines 112 to 119, respectively.

Figure 7:
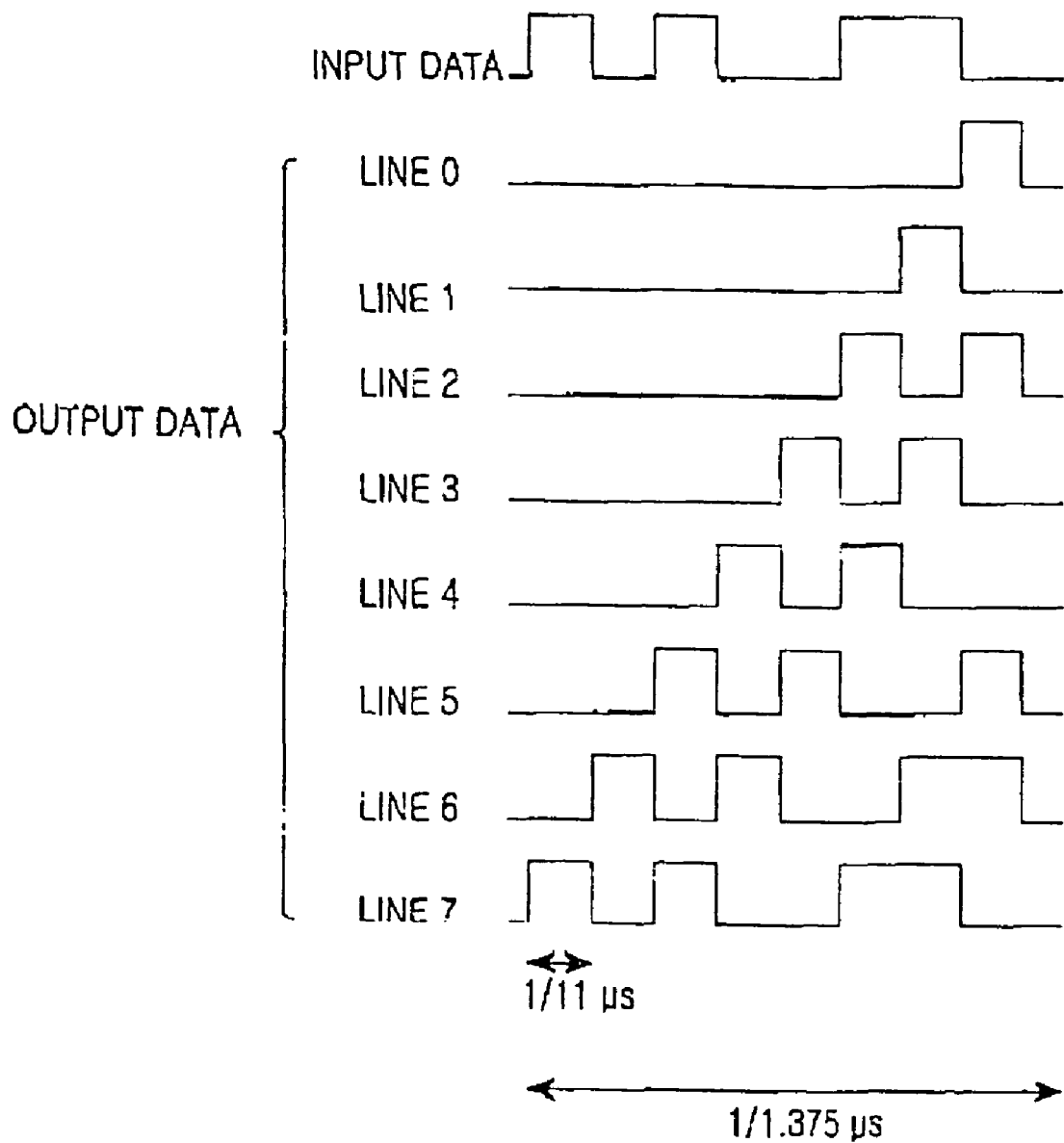
FIG. 7 illustrates an example of input and output data of the serial-to-parallel converter of FIG. 5.

FIG. 7 illustrates an example of the input data to Serial-to-parallel converter 110 and the output data (line 0 to line 7). After an 8-bit period, the state of the output lines reflects the last 8 bits of the input data. The first two bits $d_0$ and $d_1$ of each 8-bit period are directly used as an input to the differential modulator 130, which will be described herein below. The remaining bits $d_2$ to $d_7$ of the 8-bit period (i.e. bits 3 to 8) are transmitted in parallel to the look-up table 120. The look-up table 120 includes 64 unique 8-chip code words for mapping the incoming 6 bits onto an associated code word.

Figure 8:
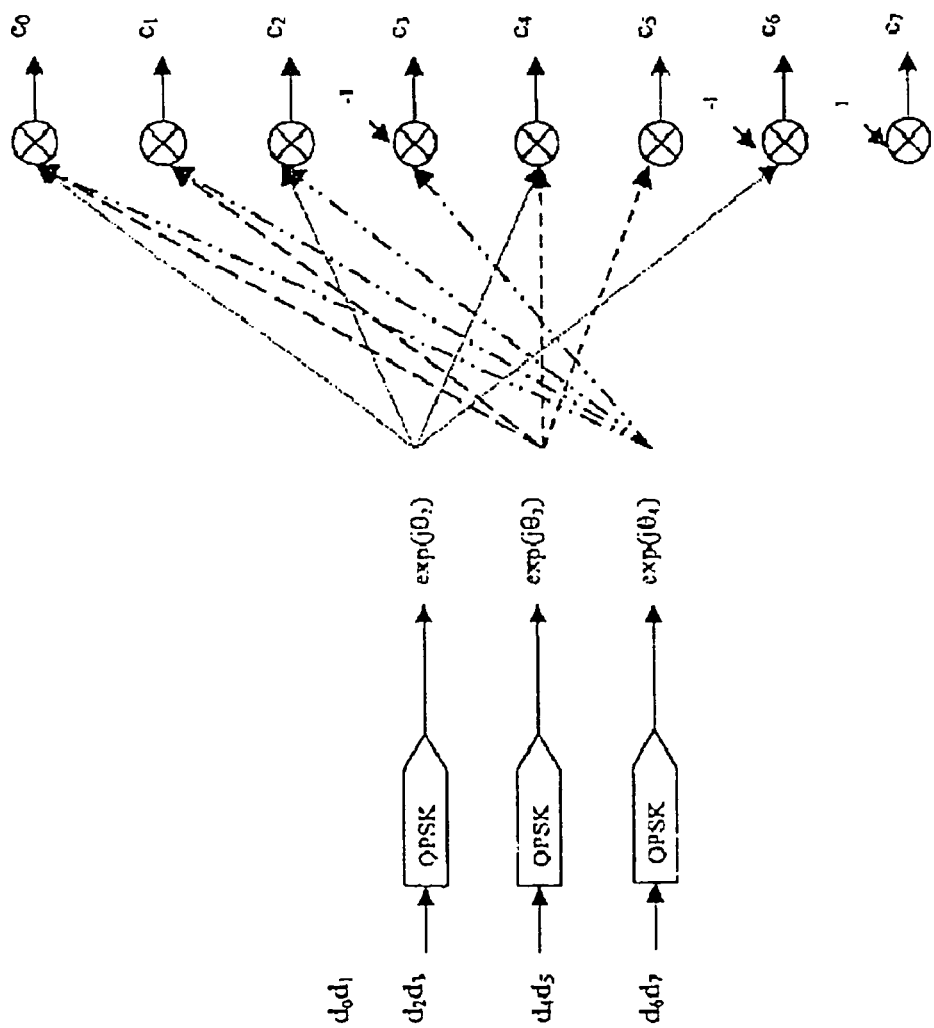
FIG. 8 illustrates an alternative means for code word derivation used in the modulator of FIG. 5.

The code words are built as described above with reference to tables 2 and 3. However, the first two bits $d_0$ and $d_1$ are not used in look-up table 120, as they are directly transmitted from Serial-to-parallel converter 110 to differential modulator 130. The code word derivation used for the encoding bits $d_2$ to $d_7$ is illustrated in FIG. 8. Table 4 illustrates the content of the look-up table 120 on a few examples. In the left-hand column, input data words are given, and in the right-hand column, the associated output code words are listed as obtained using the rules of table 3.

The look-up table is implemented in a read-only memory (ROM). For a particular 6 bit input data word $d_2 d_3 d_4 d_5 d_6 d_7$ a complex 8-chip code word $C_0 C_1 C_2 C_3 C_4 C_5 C_6 C_7$ can be derived.

As the code words are complex, two output lines 122 and 124 are provided. The real parts are placed on an inphase line 122 and the imaginary parts are placed on a separate quadrature line. The output of element 120 and the two bits $d_0$ and $d_1$ are fed to differential modulator 130.

Figure 9:
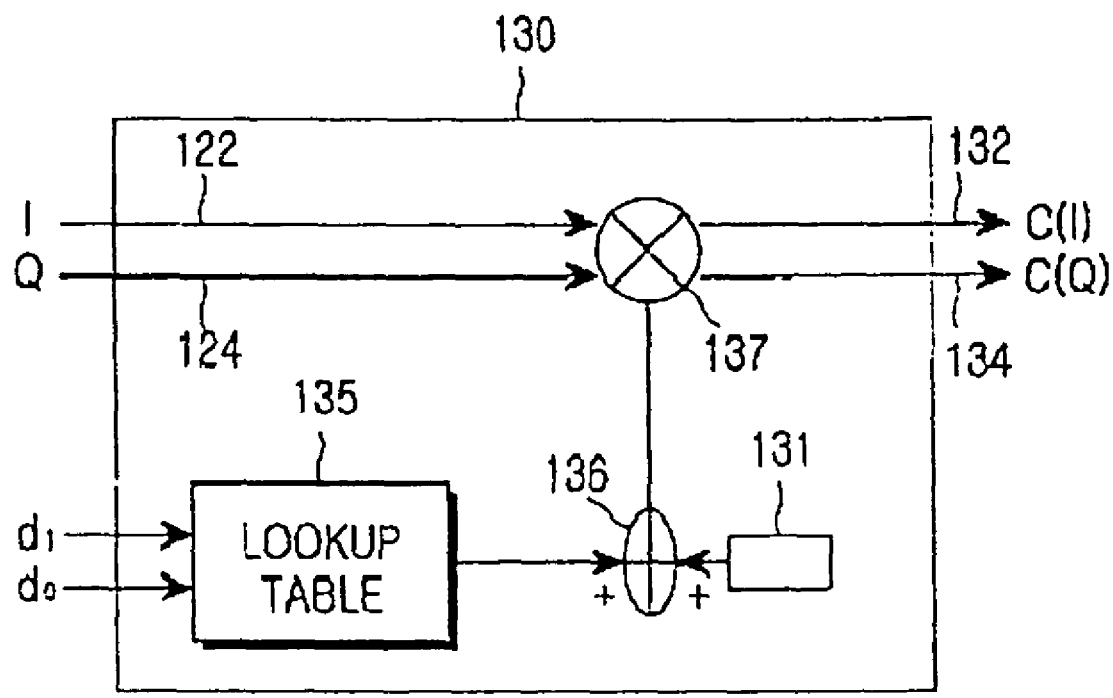
FIG. 9 is a block diagram illustrating the differential modulator 130 of FIG. 5.

FIG. 9 illustrates differential modulator 130, comprising a look-up table 135, computational element 136, memory 131, and element 137 for rotating the complex chip by an angle determined by computational element 136.

In a first step, the differential modulator 130 stores the phase $\theta'$ (i.e. $\theta_1$ of the previous 8-chip code word) in memory 131. The differential modulator then determines the phase $\theta_1$ of the current 8-chip code word based on the input data bits $d_0$ and $d_1$ according to the DQPSK encoding shown in table 1. Computational element 136 subsequently computes the phase difference $\Delta\theta_1$ between the phase $\theta'$ of the previous 8-chip code word stored in memory 131 and the phase $\theta_1$ of the current code word. Element 137 then rotates the complex chips word as received in input lines 122 and 124. Thus the differential modulator 130 encodes the first two bits $d_0$ and $d_1$ according to the DQPSK modulation described above and adds the information to the 8-chip code word obtained from look-up table 120. The effect of the CCK modulation of bits $d_0$ and $d_1$ is a rotation of the code word about phase difference $\Delta\theta_1$. The output of differential modulator 130 is the real and imaginary part of the 8-chip code word on output lines 132 and 134, respectively.

CCK+DQPSK Demodulator

Figure 10:
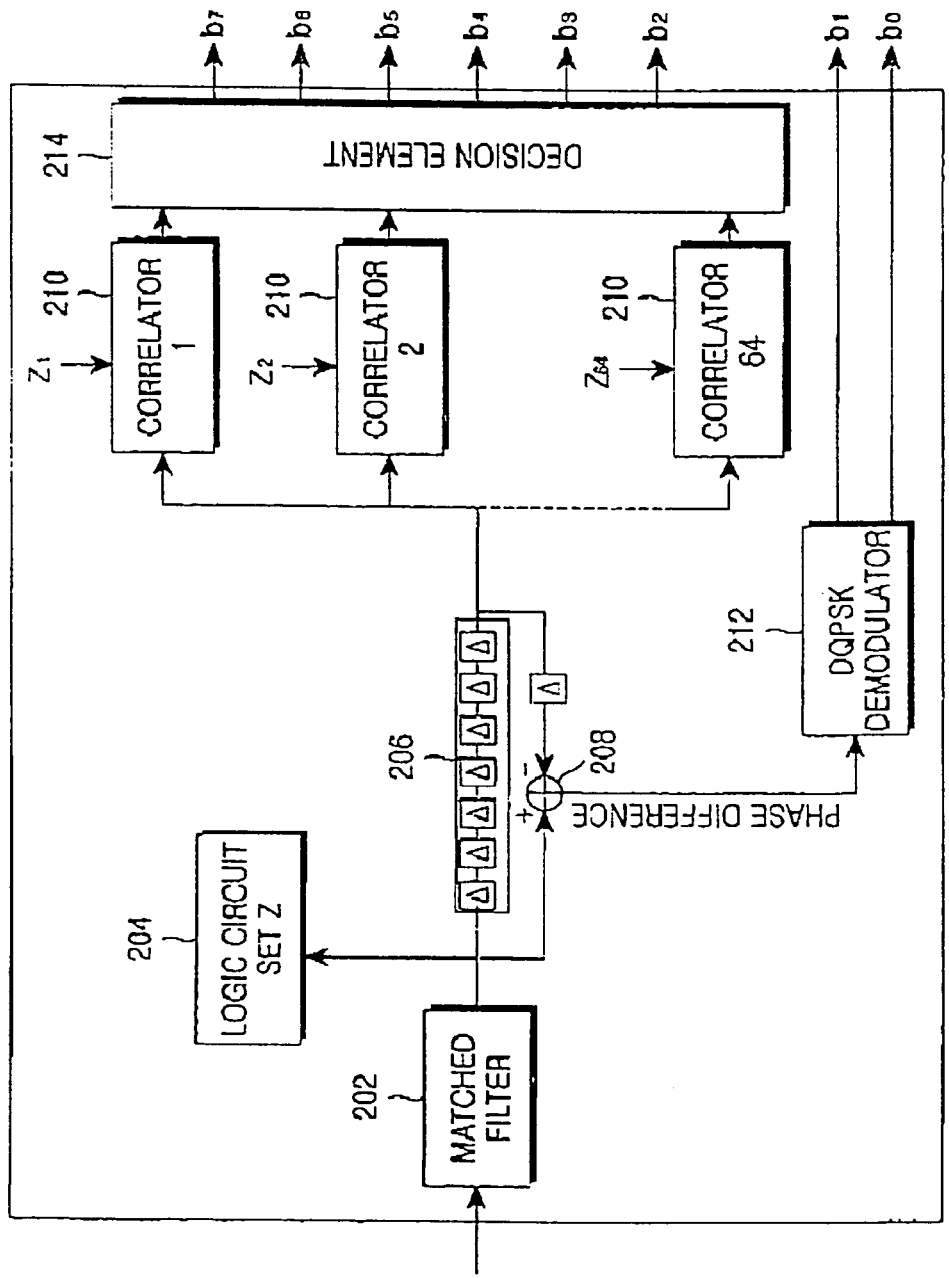
FIG. 10 is a block diagram illustrating a CCK+DQPSK demodulator according to the prior art.

FIG. 10 is a block diagram illustrating a conventional CCK+DQPSK demodulator. Referring to FIG. 10, the demodulator 200 comprises a matched filter 202, a logic circuit 204, a shift register 206, computing means 208, a bank of 64 correlators 210, a DQPSK demodulator 212, and a decision element 214. In the CCK+DQPSK demodulator 200 the received signal is transmitted to the matched filter 202 to compensate for varying channel characteristics. Matched filter 202 may be combined with a band limiting filter. Logic circuit 204 determines the global phase rotation $\theta_1$ of the code word by examining the last chip of the complex code word.

As illustrated in FIG. 10, only 64 correlators are used in the demodulator, yet there are 256 ($2^8$) possible code words that might be received. This is because the 64 initial code words from the modulator look-up table may be given an initial rotation of 0, π/2, π, or 3π/2 radians. Therefore, the demodulator may store the 4 different sets of 8-chip code words ($Z_i$) to correspond to each possible additional phase shift. The logic circuit is used to determine which set of stored 8-chip code words is to be used in the correlator.

Shift register 206 is also used to introduce a 7-chip delay prior to the correlator bank.

The DQPSK demodulator 212 computes the phase change between the current chip sequence and the previous one. A DQPSK constellation map is then used to decode the information in order to obtain the decoded bits $b_0$ and $b_1$.

As illustrated in FIG. 10, a bank of 64 complex correlators is used to demodulate the CCK signal. Each received 8-chip sequence is correlated with the 64 stored signals corresponding to the 64 possible 8-chip code words. The code word with the highest correlation is selected, indicating the best match between the received 8-chip sequence and the stored 8-chip code word, in order to decode the transmitted sequence and restore the original information.

Figure 11:
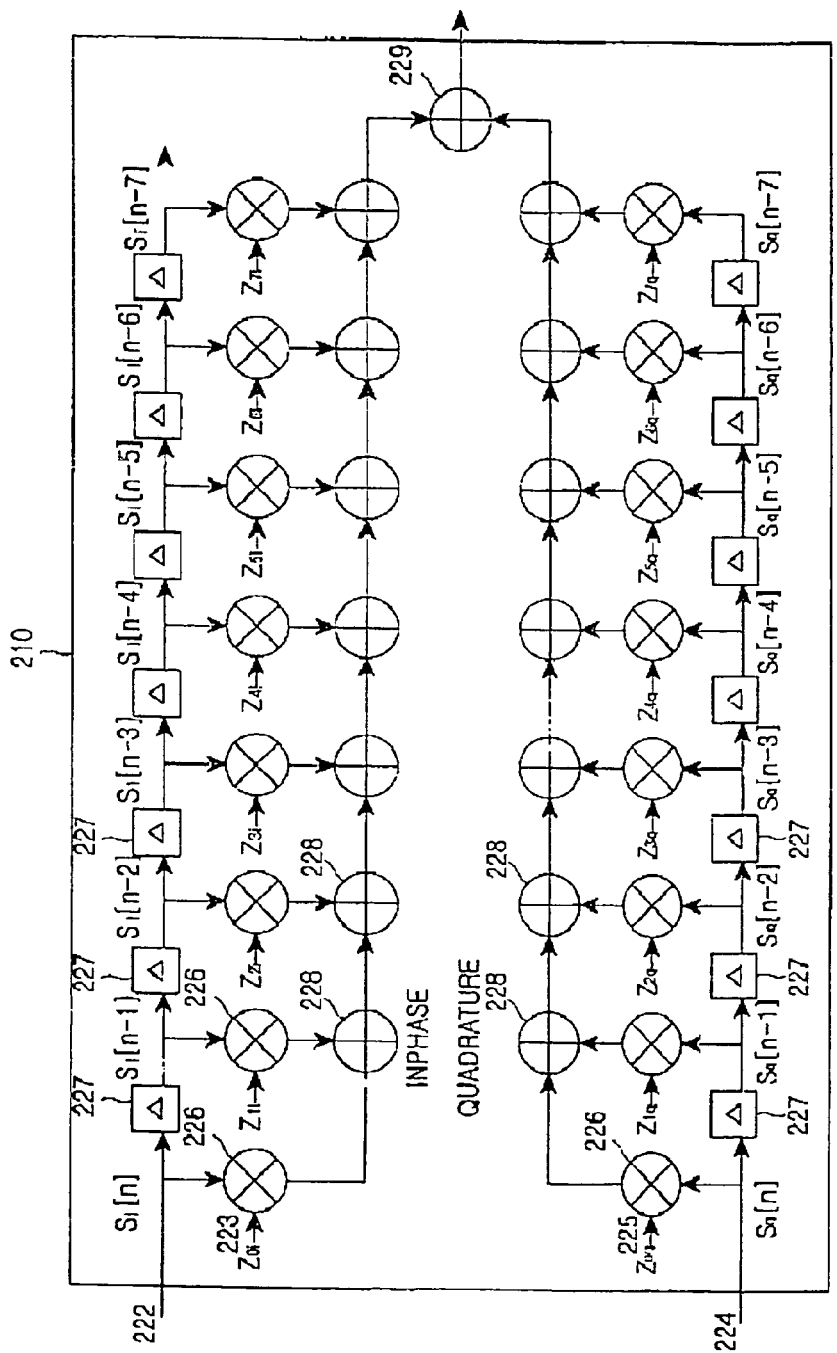
FIG. 11 is a block diagram illustrating a complex correlator 210 of FIG. 10.

Referring now to FIG. 11, a complex correlator 210, as used in the demodulator 200 of FIG. 10, is illustrated. The complex correlator 210 comprises two simple correlators, one for the inphase arm and the other for the quadrature arm; these are used to correlate the real and imaginary parts of the received chip sequence, respectively, and each of the resulting correlations are then added together by adder 229.

The real and the imaginary part of the input signal are sent to the correlator 210 on input lines 222 and 224, respectively. The correlator 210 receives the data $Z_i$ on lines 223 and 224, containing information on which set of code word (corresponding to the determined phase $\theta_1$) is to be used to determine the correlation. The correlation between the stored and received signals is then performed by the 16 correlators 226, together with shift register 227, and computing means 228 and 229.

As illustrated in FIG. 10, decision element 214 receives the outputs from the bank of 64 correlators. Element 214 includes a sampler, a comparator, and a decision circuit (not shown). The sampler estimates the amplitude of the signal received from the output of each correlator, and the comparator determines the largest sample. Decision element 14 stores all possible 6-bit data word containing bits $b_2$ to $b_7$. Based on the result from the comparator, the decision circuit outputs the data word associated with the received data. This 6-bit data word together with the two bit word $b_0 b_1$ recovered by the DQPSK demodulator 212 is then the output from CCK+ DQPSK demodulator 210 and corresponds to the demodulated transmitted data.

The entire demodulation process is then repeated for each of the following 8-chip sequences in a continuous process for the duration of communications.

GFSK Modulation

In the following description, GFSK modulation is described. Further details may for example be found in Steele and Hanzo in ["Mobile Radio Communications", Wiley, 1992], and Watson in ["FSK Signals and Demodulation", 1980].

Binary GFSK is a variation of BFSK (binary frequency shift keying). In BFSK, the binary bit 1 is mapped onto the baseband pulse +1, and the binary bit 0 is mapped onto the baseband pulse −1. The baseband pulses are frequency modulated according to Equation (1a), in which b represents the baseband pulse. Hence, the tones $S_1(t)$ and $S_2(t)$ signal bit 1 and 0 respectively, as seen in equations (1b) and (1c).

$$S(t) = A \cos(2\pi(f_c + b \Delta f)t + \theta) \quad (1a)$$

$$S_1(t) = A \cos(2\pi(f_c + \Delta f)t + \theta) \quad (1b)$$

$$S_2(t) = A \cos(2\pi(f_c + \Delta f)t + \theta) \quad (1c)$$

GFSK Modulator

Figure 12:
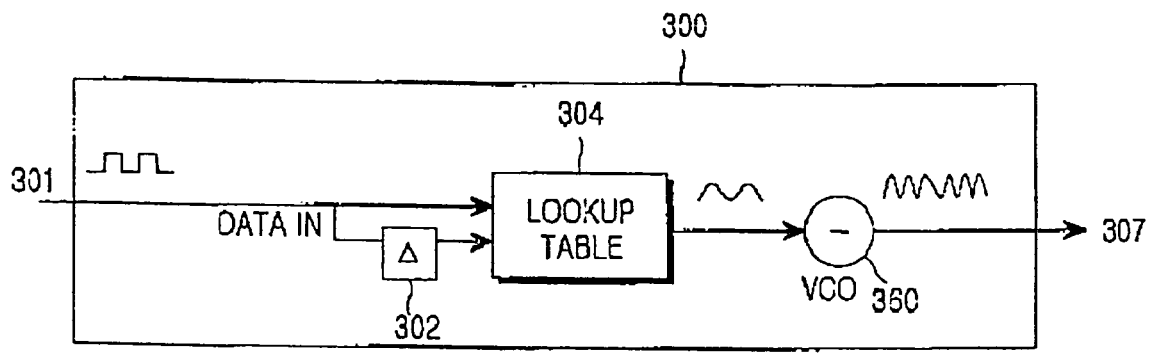
FIG. 12 is a block diagram illustrating a GFSK modulator according to the prior art.
Figure 13:
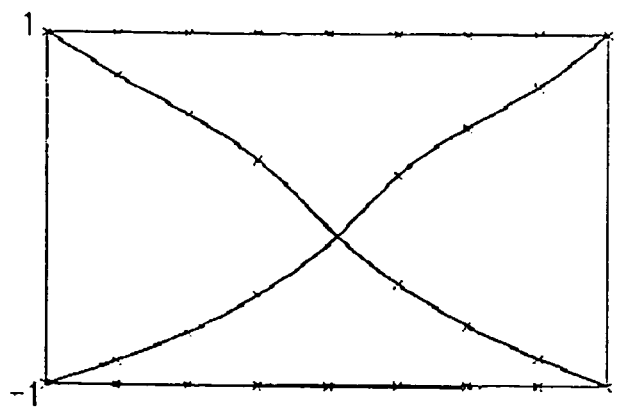
FIG. 13 illustrates Gaussian outputs according to the GFSK modulation technique.

FIG. 12 is a block diagram of a conventional GFSK modulator. Referring to FIG. 12, the modulator 300 comprises a single bit shift register 302, a look-up table 304, and a voltage controlled oscillator (VCO) 306. The look-up table 304 provides a smooth transition from one baseband pulse to the other in order to bandlimit the transmitted signal. For GFSK, Gaussian transitions are used. If the signal is bipolar, as for BFSK or binary GFSK, there will be four possible transitions. The look-up table 304 provides Gaussian outputs to the four possible dibit combinations to ensure smooth transitions for all cases. FIG. 13 illustrates the four possible GFSK outputs. Table 5 is an example of the actual values stored in a look-up table.

TABLE 5

Look-up table for a GFSK modulator.

| DATA IN ($d_{t-1}, d_t$) | GFSK table output |
|---|---|
| 00 | −1.0000, −1.0000, −1.0000, −1.0000, −1.0000, −1.0000, −1.0000, −1.0000, −1.0000, −1.0000, −1.0000, |
| 10 | 1.0000, 0.9490, 0.5852, 0.0486, −0.4358, −0.7531, −0.9121, −0.9746, −0.9940, −0.9989, −0.9998 |
| 01 | −1.0000, −0.9998, −0.9989, −0.9940, −0.9746, −0.9121, −0.7531, −0.4358, 0.0486, 0.5852, 0.9490 |
| 11 | 1.0000, 1.0000, 1.0000, 1.0000, 1.0000, 1.0000, 1.0000, 1.0000, 1.0000, 1.0000, 1.0000, |

The GFSK modulator 300 receives data on input line 301. The single bit shift register 302 delays one bit, such that two bits are sent simultaneously to the transition look-up table 304. As shown in table 5, the GFSK encoding is based on dibit $d_{t-1}, d_t$. The output of the look-up table 304 is then transmitted to VCO 306. The VCO transforms the incoming signal by frequency modulation according to equation (1a). The frequency deviation of the transmitted tone is proportional to the amplitude of the baseband signal b. With Gaussian filtering, the baseband signal b is Gaussian distributed about either +1 or −1, thus the frequency is also Gaussian distributed about frequencies $f_1$ and $f_2$.

GFSK Demodulator

Figure 14:
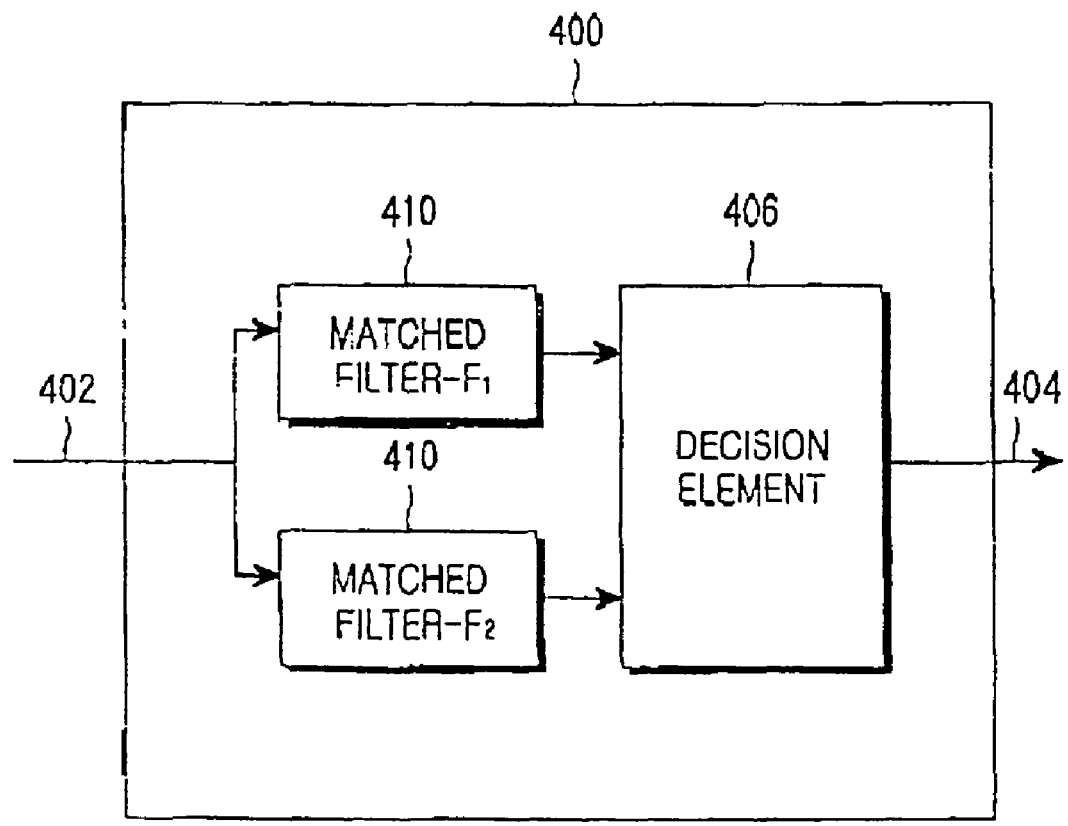
FIG. 14 is a block diagram illustrating a GFSK demodulator according to the prior art.

Referring now to FIG. 14, a conventional GFSK demodulator is described. The GFSK demodulator 400 receives the signal on input 402 and sends it to two matched filters 410. The output of these filters 410 is then sent to decision element 406 for decoding.

Decision element 406 comprises a sampler, a comparator, and a decision circuit (not shown). Decision element 406 estimates the amplitude of the signal from the output of each filter in a first step. The comparator determines which output is the largest and the decision circuit selects the associated dibit. The output line 404 delivers demodulated data.

Figure 15:
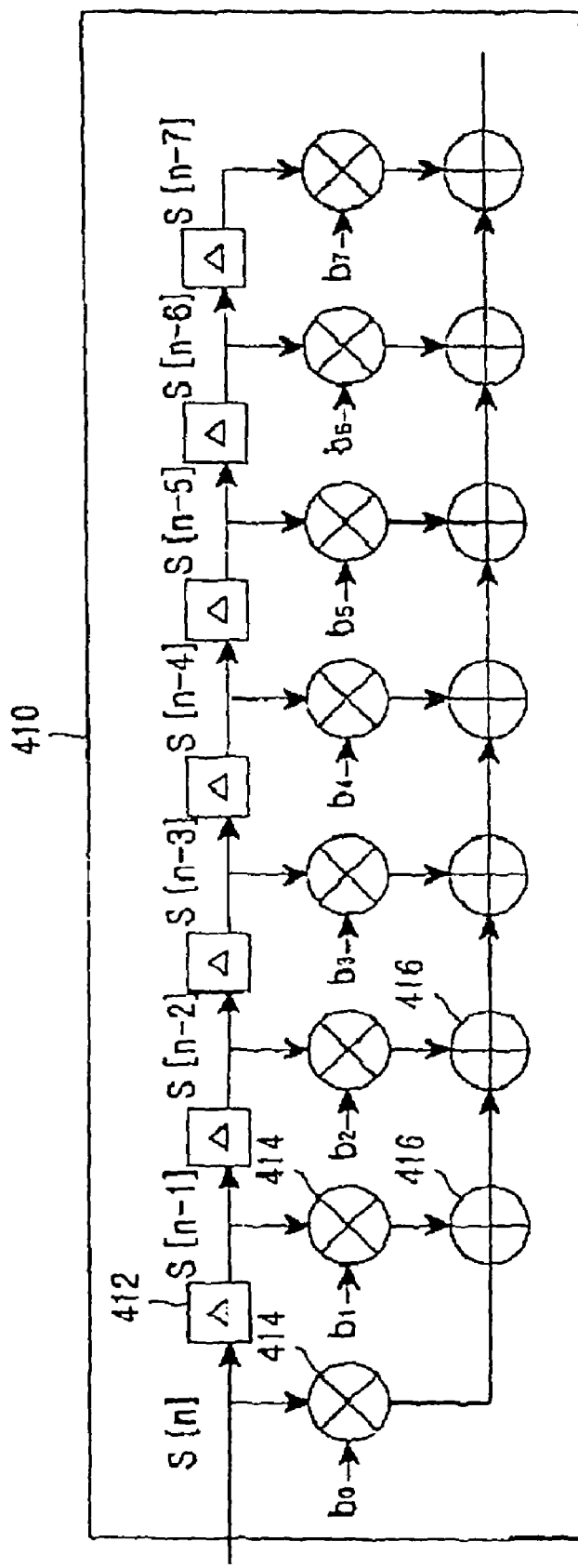
FIG. 15 is a block diagram illustrating a matched filter implemented in FIR architecture.

Of the matched filters one is matched at frequency $f_1$ so that it produces the largest output when a bit 1 is received, while the other is matched at $f_2$ and produces the largest output when a bit 0 is received. Matched Filters can be implemented using a number of different architectures such as Finite Impulse Response Filters (FIRs) or Infinite Impulse Response Filters (IIRs), cascaded, and mixed architectures. A matched filter realised in an FIR architecture is illustrated in FIG. 15.

Filter 410 comprises a shift register 412, computational elements 414, and adders 416. The FIR basic architecture can be used to realise a number of different filter types, for example, Butterworth, Chebychev, Elliptical, Raised Cosine, Root Raised Cosine, etc. All have different performance in terms of, for example, cut-off gradiant, ripples in pass-band and stop bands, etc. Although they can be realised using the basic FIR architecture, each is likely to be of different overall complexity, including making use of cascaded filter stages. In its basic form illustrated in FIG. 15 an appropriate filter design would result in the determination of the FIR filter coefficients or weights $b_0$ to $b_7$. It is quite likely to have a larger number of weights than 8.

The input waveform time samples, in the form of Finite Impulses, are fed to the input of the filter. The initial conditions for the filter would be that all outputs from the delay units are set to zero. The output from the filter, after the arrival of the first impulse, $i_0$, at the filter input would thus be $i_0 b_0$. The second output from the filter, after the arrival of the second impulse, $i_1$, at the filter input would be $i_0 b_1 + i_1 b_0$. The third output from the filter, after the arrival of the third impulse, $i_2$, at the filter input would be $i_0 b_2 + i_1 b_1 + i_2 b_0$ and so on. Consequently, the nth output from the filter after the arrival of the nth impulse, in, at the filter input would be $i_0 b_{(n-1)} + i_1 b_{(n-2)} + i_2 b_{(n-3)} + \ldots + i_{(n-3)} b_2 + i_{(n-2)} b_1 + i_{(n-1)} b_0$. The output waveform obtained in this way will be a bandlimited version of the input waveform, i.e. it will be matched to the waveform of interest, i.e., the one to be recovered.

The previous two known modulation schemes, i.e. CCK+DQPSK and GFSK modulation, have been described together with possible ways of implementation (i.e. a modulator and a demodulator applying the schemes). In the following, an embodiment of the present invention will be described. This embodiment includes an integrated modulator, which is capable of modulating data according to both modulation schemes, CCK+DQPSK and GFSK, and also includes a demodulator capable of demodulating modulated data according to both modulation schemes.

Embodiment of the Present Invention

Integrated Modulator

Figure 16:
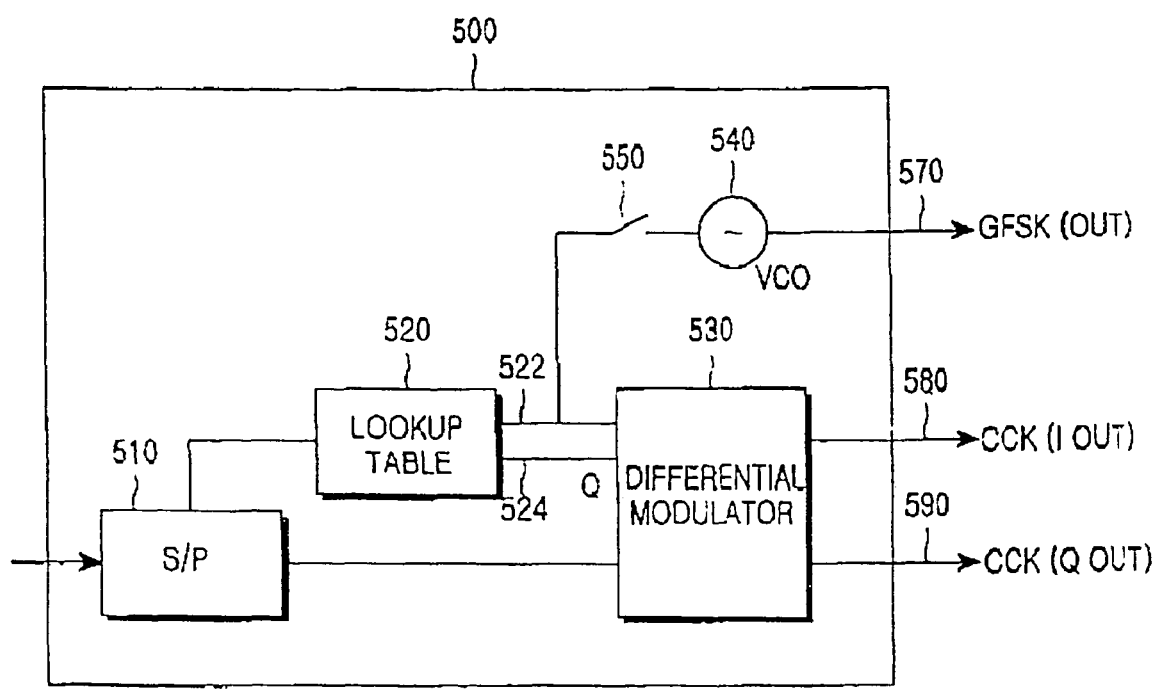
FIG. 16 is a block diagram illustrating an integrated modulator according to an embodiment of the present invention.

FIG. 16 is a block diagram illustrating an integrated modulator according to an embodiment of the present invention. Referring to FIG. 16, an integrated modulator 500, like the to the CCK+DQPSK modulator of FIG. 5, includes a serial-to-parallel converter 510, a look-up table 520, and a differential modulator 530. In addition, the modulator 500 also includes a switch 550 and a VCO 540.

Because of the similarities of modulator 100 (of FIG. 5) and 500 (of FIG. 16), in the following, the modifications of modulator 500 compared to the CCK+DQPSK modulator of FIG. 5 are described. These modifications enable the integrated modulator 500 not only to modulate data according to the CCK+DQPSK technique, but also to the GFSK modulation scheme.

The serial-to-parallel converter 510 can be adapted to different timings depending on whether the modulator is used in the CCK+DQPSK or the GFSK mode. The look-up table 520 is extended such that the GFSK encoding data is also included in the QPSK table.

Serial-to-Parallel Converter

From FIGS. 5 and 12, it can be seen that both CCK+DQPSK, and GFSK require serial-to-parallel conversion. CCK+DQPSK requires this operation in order to group the incoming data bits into 8-bit data words, while GFSK needs serial-to-parallel conversion so that 2 bits, i.e., the current and previous data bit, can be sent to the look-up table simultaneously. The serial-to-parallel converter 510 can achieve both of these operations, as long as the clock speed is adjusted accordingly. Thus, a serial-to-parallel converter with an architecture of converter 110 of FIG. 6 is used and means for adjusting timing requirements are added.

For CCK+DQPSK, the data enters the converter 510 at, for example, a rate of 11 MHz, while data leave the converter and are sent to the look-up table 520 at a rate of, for example, 1.375 MHz. In this way, each time the serial-to-parallel converter output is sent to the look-up table 520, the state of the eight parallel output lines reflect the last 8 data bits. In the GFSK mode, the serial-to-parallel converter 510 sends its output to the look-up table at a rate of, for example, 11 MHz, i.e. at a speed 8 times faster than for the CCK+DQPSK mode. Serial-to-parallel converter 510 thus needs to be able to handle data at a rate of 11 MHz. In the CCK+DQPSK mode, the clocking speed needs to be reduced by a factor of 8 compared to the clocking rate of the GFSK mode. This can be achieved by using an additional divider circuit. No additional clock is required.

However, as in the GFSK mode only two databits are handled simultaneously, only the databits $d_6$ and $d_7$ of lines 118 and 119 (see FIG. 6) are used for GFSK encoding. This can be implemented by either setting all remaining bits $d_2$ to $d_5$ to zero or by simply ignoring these bits in the encoding preformed in the extended lookup table 520 (see the description below).

For CCK+DQPSK encoding the serial-to-parallel converter output lines 114 to 119 are used.

Look-Up Table

Both CCK+DQPSK and GFSK use look-up tables as part of the modulation process. The integrated modulator uses a combined look-up table. Compared to the look-up table used for CCK+DQPSK encoding, an additional column is provided for the GFSK mode. Table 6 illustrates the combined look-up table.

TABLE 6

Integrated Modulator Look-up table

| DATA IN | CCK table output | GFSK table output | | | | |
|---|---|---|---|---|---|---|
| $d_2 d_3 d_4 d_5 d_6 d_7$ | $c_0 c_1 c_2 c_3 c_4 c_5 c_6 c_7$ | $c_0$ | $c_1$ | $c_2$ | $c_3$ | $c_4$ |
| 0 0 0 0 0 0 | +1 +1 +1 −1 +1 +1 −1 +1 | −1.0000, | −1.0000, | −1.0000, | −1.0000, | −1.0000, |
| : | : | — | — | — | — | — |
| 0 0 0 0 1 0 | −1 −1 −1 +1 +1 +1 −1 +1 | 1.0000, | 0.9490, | 0.5852, | 0.0486, | −0.4358, |
| : | : | — | — | — | — | — |
| 0 0 0 0 0 1 | +j +j +j −j +1 +1 −1 +1 | −1.0000, | −0.9998, | −0.9989, | −0.9940, | −0.9746, |
| : | : | — | — | — | — | — |

TABLE 6-continued

Integrated Modulator Look-up table

| 0 0 0 0 1 1 | −j −j −j +j +1 +1 −1 +1 | 1.0000, | 1.0000, | 1.0000, | 1.0000, | 1.0000, |
|---|---|---|---|---|---|---|
| ⋮ | ⋮ | — | — | — | — | — |
| 1 1 1 1 1 1 | +j −1 −1 +j −1 −j +j +1 | — | — | — | — | — |

| DATA IN | | GFSK table output | | | | |
|---|---|---|---|---|---|---|
| $d_2 d_3 d_4 d_5 d_6 d_7$ | $c_5$ | $c_6$ | $c_7$ | $c_8$ | $c_9$ | $c_{10}$ |
| 0 0 0 0 0 0 | −1.0000, | −1.0000, | −1.0000, | −1.0000, | −1.0000, | −1.0000, |
| ⋮ | — | — | — | — | — | — |
| 0 0 0 0 1 0 | −0.7531, | −0.9121, | −0.9746, | −0.9940 | −0.9989 | −0.9998 |
| ⋮ | — | — | — | — | — | — |
| 0 0 0 0 0 1 | −0.9121, | −0.7531, | −0.4358, | 0.0486, | 0.5852, | 0.9490 |
| ⋮ | — | — | — | — | — | — |
| 0 0 0 0 1 1 | 1.0000, | 1.0000, | 1.0000, | 1.0000, | 1.0000, | 1.0000, |
| ⋮ | — | — | — | — | — | — |
| 1 1 1 1 1 1 | — | — | — | — | — | — |

The integrated look-up table has three columns. The first column is for the input data code words and has 64 entries from 000000 to 111111. The next column lists the CCK code words, which are 8 complex chips long, corresponding to each of the data words in the first column.

As described above, the GFSK mode uses only 4 possible dibits, thus the GFSK look-up table has only four lines. The last column of the integrated look-up table therefore requires only four GFSK code words. However, these words need to be placed carefully.

As described above, the serial-to-parallel converter 510 delivers the GFSK output in the GFSK mode on the bit positions $d_6$ and $d_7$. Therefore, if the remaining input lines are forced to zero during the GFSK mode, the only possible look-up table inputs used in the GFSK mode are 000000, 000010, 000001, and 000011. Thus, in the third column, only GFSK code word values are provided for these four input words.

If the remaining bits $d_2$ to $d_5$ are not set to zero in the converter 510, the same method can be applied by ignoring in the look-up table all bits in the GFSK mode except the two last bits $d_6$ and $d_7$.

In response to the input, the look-up table has the task of providing a smooth (Gaussian) transition from amplitude levels +1 to +1, +1 to −1, −1 to +1, and +1 to +1 respectively.

In the present embodiment, GFSK code word is 11 chips in length so that a clocking speed of 11 MHz will result in a data rate of 1 Mbps. This rate corresponds to the maximum data rate for Bluetooth.

Voltage Controlled Oscillator

In the GFSK mode, the inphase output line 522 is connected to a VCO 540 by switch 550. In this way the Gaussian distributed values received from look-up table 520 are frequency modulated and sent to GFSK output line 570.

In the CCK+DQPSK mode, the VCO is disconnected by switch 550. The data from look-up table 520 are further handled in the differential modulator 530 as described above for the CCK+DQPSK modulator and are subsequently sent to the two CCK+DQPSK output lines 580 and 590.

Integrated Demodulator

Figure 17:
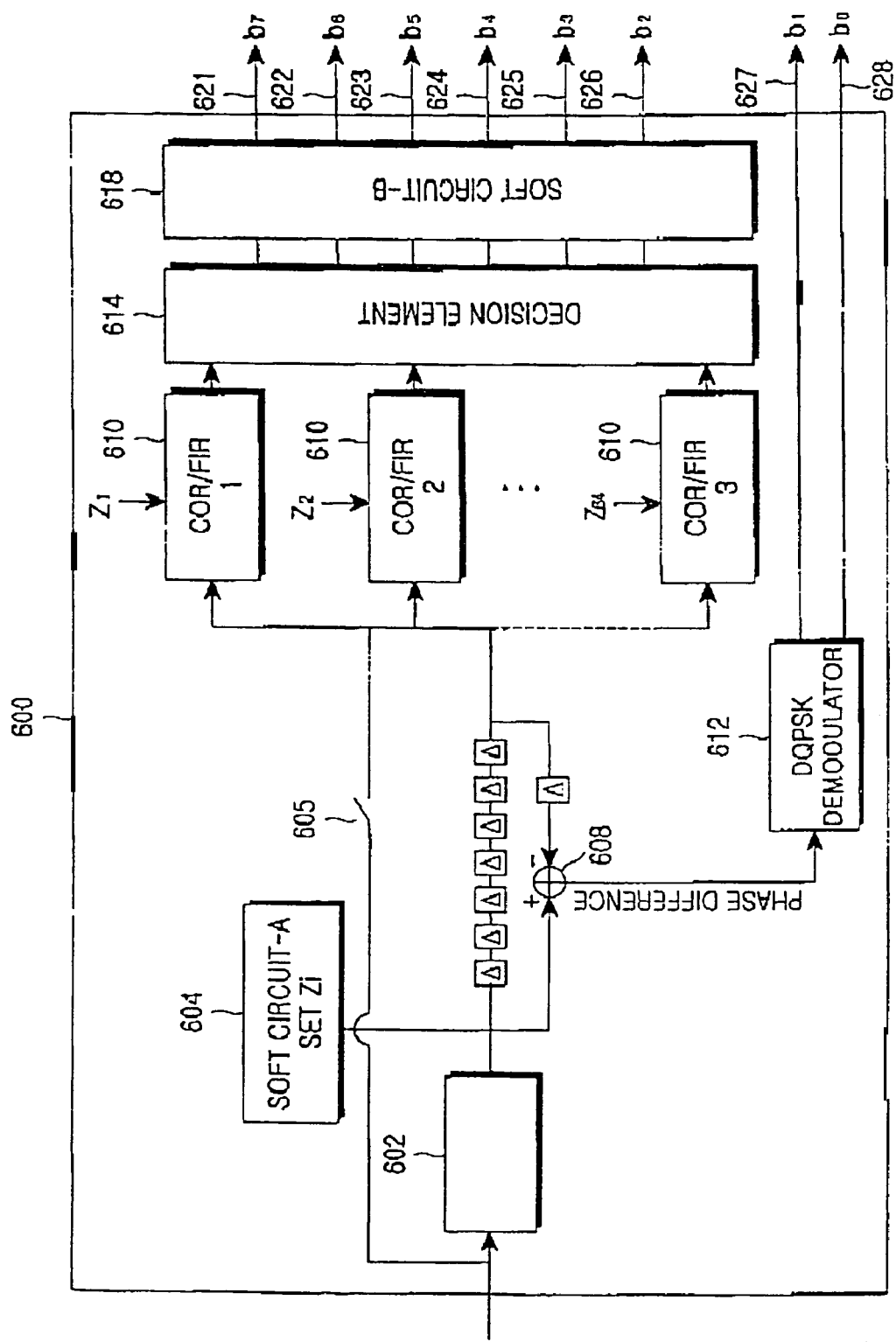
FIG. 17 is a block diagram illustrating an integrated demodulator according to an embodiment of the present invention.

FIG. 17 is a block diagram illustrating an integrated demodulator according to an embodiment of the present invention. Referring now to FIG. 17, similar to the CCK+DQPSK demodulator of FIG. 10, the demodulator 600 includes a matched filter 602, a logic circuit 604, a shift register 606, a computing means 608, 64 correlators 610, a DQPSK demodulator 612, and decision element 614. In addition, demodulator 600 includes switching means 605 and a logic circuit 618.

Again, the architecture of the integrated demodulator 600 is based on the architecture of the CCK+DQPSK demodulator of FIG. 10. Thus, in the following, only the modification of the demodulator 600 compared to the CCK+DQPSK demodulator of FIG. 10 will be described.

Switch

Switch 605 is used to switch the demodulator 600 between the GFSK mode and the CCK+DQPSK mode. CCK+DQPSK demodulation requires a channel matched filter 602, and a seven-bit delay before the correlation procedure starts. This matched filter 602 and delay line 606 are not necessary for GFSK demodulation. Switch 605 is thus included to switch these components off when the demodulator 600 is in GFSK mode. In a similar manner, other parts of the demodulator circuit can be switched on and off depending on which modulation functionality required (see the description below).

The CCK+DQPSK demodulator illustrated in FIG. 10 uses a bank of 64 correlators to compare the received code word with stored prototype code words. On the other hand, the GFSK demodulator in FIG. 14 uses two filters matched at frequencies $f_1$ and $f_2$. Both functionalities, i.e., the functionality of a correlator for the CCK+DQPSK decoding and the functionality of a matched filter for the GFSK decoding can be performed by an FIR, provided that the weights of the tap delay line are adjustable. If the FIR filter is used as a correlator in the CCK+DQPSK mode, the weights need to be adjusted such that the signal received by the correlator correspond to the appropriate signal stored in the correlator as a "prototype symbol".

If, on the other hand, the FIR filter is used as a matched filter in the GFSK mode, the weights of two of the filters can be set to the appropriate impulse responses so that they match to the frequencies $f_1$ and $f_2$ and the remaining filters can be switched off using appropriate switches (not shown).

However, because the output from the redundant filters will be zero in GFSK mode, GFSK mode can alternatively be operated without switching off the remaining filters. In this way the matched filter of FIR architecture described with reference to FIG. 15 above can be used both as a correlator and as a matched filter depending on the filters weights. The weights of the combined correlators/filters 610 for the integrated demodulator are thus programmable.

FIR architecture as illustrated in FIG. 15 can be used as a module of the complex correlators 610 (i.e., similar to the modules of the correlators 210 described above with reference to FIG. 11, where the outputs of both correlator modules for the real and the imaginary part are summed). In this way a complex correlator for the CCK+DQPSK mode is provided.

As an example, assume that the complex correlator is the last in the bank of 64. Then the weights on the inphase and quadrature braches are set to $Z_{64}=+j-1-1+j-1-j+j+1$. If the $64^{th}$ CCK+DQPSK symbol ($S_{64}$) is received, then the output of the correlator is given by the expression in equation (2) below. No other correlator will have a greater output.

$$\text{Output}=(0\times0+(-1)\times(-1)+(-1)\times(-1)+0\times0+(-1)\times(-1)+0\times0+0\times0+1\times1)+(1\times1+0\times0+0\times0+1\times1+0\times0+(-1)\times(-1)+1\times1+0\times0)=8 \quad (2)$$

In GFSK mode, all the weights of 62 complex correlators 610 out of the 64 correlators are set to zero, and thus their outputs will always be zero. Alternatively, these 62 correlators 610 can be switched off using appropriate switches (not shown).

The remaining two correlators 610 have the weights on one of their arms (e.g. the quadrature arm) set to zero, reducing them to simple FIR filters. The weights on the remaining arm of one of these correlators are set to the appropriate impulse response that will match it to a signal frequency $f_1$. Similarly, the same procedure is repeated with the second complex correlator to match it to frequency $f_2$.

The outputs of the correlators 610 are fed into decision element 614 on lines 621 to 626. The output of the decision element 614 is then transmitted to logic circuit 618 on the six parallel lines 621 o 626.

When a signal reaches decision element 614, the element determines with the sampler and comparator which one of correlators 610 produces the greatest output and sends out a bit 1 on the output line associated with this correlator. Logic circuit 618 ensures that the output of the demodulator 600 is appropriate for both the GFSK and the CCK+DQPSK mode. Logic circuit 618 outputs the data word for CCK+DQPSK mode, and the data bit for GFSK mode, in a suitable form. In CCK+DQPSK mode, there are 64 output possibilities, and in GFSK mode there are only 2 possible outputs.

A control signal from the modem switches between the two modulation techniques, i.e., the CCK+DQPSK and the GFSK mode. The integrated modulator then automatically sets all the appropriate switches (such as switch 550 and 605) and selects the according functions (for example in the serial-to-parallel converter 510, the FIR elements 610 and the logic circuit 618) such that the modem correctly modulates or demodulates data according to the selected modulation technique.

As the modem according to embodiments of the present invention is an integrated modem rather than two separate modems, which are combined as in the prior art described above, no inter working element is needed. This results from the fact that the integrated modem, i.e., the integrated modulator and the integrated demodulator, uses most of the individual elements or building blocks for both modulation or demodulation techniques.

Alternate Embodiments

In the foregoing, an integrated modem architecture is described which is capable of modulating and demodulating signal in accordance with the CCK+DQPSK and the GFSK modulation technique. It should be appreciated that alternatively an integrated modem capable of modulating and demodulating in accordance with other modulation techniques can be used, like for example GFSK and QPSK, CCK+DQPSK and QPSK, GFSK and QAM QPSK, and QAM or CCK+DQPSK and QAM.

In addition, integrated modems capable of modulating/demodulating according to more than two modulation techniques can be used. The above described embodiment can for example be extended such that the modem is capable of modulating/demodulating three modulation techniques: CCK+DQPSK, GFSK, and QPSK. This can be implemented by again adjusting the timing, the use of additional switches (to switch off the differential demodulator and the DQPSK demodulator for the QPSK mode).

While the present invention has been shown and described with reference to a certain preferred embodiment thereof, it will be understood by those skilled in the art that various changes in form and details may be made therein without departing from the spirit and scope of the invention as defined by the appended claims.

What is claimed is:

1. A modulating device for modulating and demodulating data for transmission from a first device to a second device, comprising modulating means capable of modulating and demodulating the data according to at least a first and a second modulation technique using common digital modulation components, a switching means for automatically switching between at least the first and the second modulation techniques, and a plurality of building blocks, wherein at least one of the plurality of building blocks is used for at least one of modulating and demodulating data according to the at least first and second modulation techniques, wherein at least one building block comprises a programmable finite impulse response filter, a look-up table, and a serial-to-parallel converter, and wherein the programmable finite impulse response filter is used as a correlator in a first mode of the first modulation technique.

2. The device according to claim 1, wherein the programmable finite impulse response filter is programmable to the first mode and a second mode for the first and second modulation techniques, respectively.

3. The device according to claim 2, wherein the programmable finite impulse response filter is used as matched filters in the second mode.

4. The device according to claim 2, wherein the look-up table includes data related to the first and second modulation techniques.

5. The device according to claim 4, wherein the look-up table comprises n input words, m output words relating to the first modulation technique, and p output words relating to the second modulation technique, wherein $n \geq m$ and $n \geq p$, and wherein n, m and p are integers.

6. The device according to claim 5, wherein $n>p$ and wherein only p input words are used for determining output words related to the second modulation technique.

7. The device according to claim 2, wherein the modulating means automatically switches between the first and second modes.

8. The device according to claim 1, wherein the programmable finite impulse response filter is adaptable by varying its weights.

9. The device according to claim 1, further comprising timing means adjustable to a first clocking time used for modulating and demodulating data according to the first modulation technique and a second clocking time used for modulating and demodulating data according to the second modulation technique.

10. The device according to claim 9, wherein the timing means comprises a serial-to-parallel converter.

11. The device according to claim 1, wherein the first and second modulation techniques are Complementary Code Keying (CCK) with Differential Quadrature Phase Shift Keying (DQPSK) (CCK+DQPSK) and Gaussian Frequency Shift Keying (GFSK) modulation techniques.

12. The device according to claim 1, wherein the first and second modulation techniques are Quadrature Phase Shift Keying (QPSK) and Gaussian Frequency Shift Keying (GFSK) modulation techniques.

13. The device according to claim 1, wherein the first and second modulation techniques are a frequency modulation technique and a quadrature modulation technique.

14. An electronic device for communicating data to and receiving data from a second electronic device, the device comprising modulating means capable of modulating and demodulating the data according to at least a first and a second modulation technique using common digital modulation components, a switching means for automatically switching between at least the first and the second modulation techniques, and a plurality of building blocks, wherein at least one of the plurality of building blocks is used for at least one of modulating and demodulating data according to the at least first and second modulation techniques, wherein at least one building block comprises a programmable finite impulse response filter, a look-up table, and a serial-to-parallel converter, and wherein the programmable finite impulse response filter is used as a correlator in a first mode.

15. A method for modulating data for transmission from a first device to a second device and demodulating modulated data suitable for a first modulation technique such that the data is modulated and demodulated according to at least a first and a second modulation technique, the method comprising providing a common digital modulation component used in both techniques, providing a switching means for automatically switching between at least the first and the second modulation techniques, and providing a plurality of building blocks, wherein at least one of the plurality of building blocks is used for at least one of modulating and demodulating data according to the at least first and second modulation techniques, wherein at least one building block comprises a programmable finite impulse response filter, a look-up table, and a serial-to-parallel converter, and wherein the programmable finite impulse response filter is used as a correlator in a first mode.

* * * * *